(12) United States Patent
Newman

(10) Patent No.: US 11,650,972 B1
(45) Date of Patent: May 16, 2023

(54) SEMANTIC COMPLIANCE VALIDATION FOR BLOCKCHAIN

(71) Applicant: Wells Fargo Bank, N.A., San Francisco, CA (US)

(72) Inventor: David Newman, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 929 days.

(21) Appl. No.: 15/368,120

(22) Filed: Dec. 2, 2016

Related U.S. Application Data

(60) Provisional application No. 62/319,837, filed on Apr. 8, 2016, provisional application No. 62/314,333, filed on Mar. 28, 2016, provisional application No. 62/262,047, filed on Dec. 2, 2015.

(51) Int. Cl.
| | |
|---|---|
| *G06F 16/00* | (2019.01) |
| *G06F 16/23* | (2019.01) |
| *G06F 16/21* | (2019.01) |
| *G06F 16/22* | (2019.01) |

(52) U.S. Cl.
CPC ........ *G06F 16/2365* (2019.01); *G06F 16/211* (2019.01); *G06F 16/2255* (2019.01)

(58) Field of Classification Search
CPC . G06F 16/2365; G06F 16/211; G06F 16/2255
See application file for complete search history.

(56) References Cited

U.S. PATENT DOCUMENTS

| | | | |
|---|---|---|---|
| 8,285,967 B1 | 10/2012 | Veeraswamy et al. | |
| 9,749,297 B2 | 8/2017 | Gvili | |
| 9,948,467 B2* | 4/2018 | King | H04L 63/0823 |
| 2004/0189708 A1* | 9/2004 | Larcheveque | G06F 17/2247 715/780 |
| 2007/0112718 A1* | 5/2007 | Liu | G06N 5/02 706/47 |
| 2009/0112903 A1 | 4/2009 | Llang et al. | |
| 2009/0300002 A1* | 12/2009 | Thomas | G06F 16/2457 |
| 2009/0319794 A1* | 12/2009 | Hoertnagl | H04L 9/3247 713/176 |

(Continued)

FOREIGN PATENT DOCUMENTS

EP 2383664 11/2011

OTHER PUBLICATIONS

"U.S. Appl. No. 15/368,127, Response filed Apr. 22, 2019 to Non Final Office Action dated Dec. 21, 2018", 9 pgs.

(Continued)

*Primary Examiner* — Diedra McQuitery
(74) *Attorney, Agent, or Firm* — Schwegman Lundberg & Woessner, P.A.

(57) ABSTRACT

A method may include receiving, at a computing device, an electronic data structure, the electronic data structure including: a location of a validation source for a payload of the data structure; and the payload, wherein the payload identifies a plurality of elements of a transaction; retrieving, from the validation source, a semantic schema; validating the payload of the data structure according to the semantic schema; and based on a result of the validating indicating the payload complies with the semantic schema, appending an electronic compliance signature to the data structure.

17 Claims, 12 Drawing Sheets

(56) References Cited

U.S. PATENT DOCUMENTS

| | | | |
|---|---|---|---|
| 2010/0217975 A1* | 8/2010 | Grajek | G06F 21/445 713/157 |
| 2010/0281061 A1* | 11/2010 | Chen | G06F 16/2365 707/794 |
| 2011/0246530 A1* | 10/2011 | Malafsky | G06N 5/022 707/794 |
| 2012/0042395 A1* | 2/2012 | Jain | H04L 63/102 726/30 |
| 2012/0101975 A1* | 4/2012 | Khosravy | G06Q 10/063 706/55 |
| 2013/0086100 A1* | 4/2013 | de Cerqueira Gatti | G06F 16/88 707/769 |
| 2014/0324908 A1* | 10/2014 | Graham | G06F 16/215 707/776 |
| 2015/0244690 A1 | 8/2015 | Mossbarger | |
| 2015/0261796 A1* | 9/2015 | Gould | G06F 16/215 707/694 |
| 2015/0332283 A1* | 11/2015 | Witchey | H04W 12/02 705/3 |
| 2015/0349961 A1* | 12/2015 | Mosko | H04L 9/3239 713/189 |
| 2016/0205178 A1* | 7/2016 | Mosko | H04L 67/104 709/204 |
| 2016/0358169 A1 | 12/2016 | Androulaki et al. | |
| 2017/0046693 A1 | 2/2017 | Haldenby et al. | |
| 2017/0068911 A1* | 3/2017 | Wiig | G06F 16/3331 |
| 2017/0132626 A1* | 5/2017 | Kennedy | G06Q 20/065 |
| 2017/0140375 A1 | 5/2017 | Kunstel | |
| 2018/0083965 A1 | 3/2018 | Donovan | |
| 2022/0358185 A1 | 11/2022 | Newman | |

OTHER PUBLICATIONS

"U.S. Appl. No. 15/368,127, Non Final Office Action dated Dec. 21, 2018" 26 pgs.

U.S. Appl. No. 15/368,127, filed Dec. 2, 2016, Traversing Data Structures for Compliance.

"U.S. Appl. No. 15/368,127, Final Office Action dated Aug. 6, 2019", 21 pgs.

"U.S. Appl. No. 15/368,127, Examiner Interview Summary dated Dec. 13, 2019", 4 pgs.

"U.S. Appl. No. 15/368,127, Non Final Office Action dated Feb. 21, 2020".

"U.S. Appl. No. 15/368,127, Response filed Dec. 6, 2019 to Final Office Action dated Aug. 6, 2019", 8 pgs.

"U.S. Appl. No. 15/368,127, Final Office Action dated Jun. 10, 2020".

"U.S. Appl. No. 15/368,127, Response filed May 20, 2020 to Non Final Office Action dated Feb. 21, 2020", 9 pgs.

"U.S. Appl. No. 15/368,127, Advisory Action dated Sep. 4, 2020".

"U.S. Appl. No. 15/368,127, Non Final Office Action dated Oct. 2, 2020".

"U.S. Appl. No. 15/368,127, Response filed Aug. 10, 2020 to Final Office Action dated Jun. 10, 2020".

"U.S. Appl. No. 15/368,127, Response filed Sep. 11, 2020 to Advisory Action dated Sep. 4, 2020", 10 pgs.

"U.S. Appl. No. 15/368,127, Response filed Dec. 23, 2020 to Non Final Office Action dated Oct. 2, 2020".

"U.S. Appl. No. 15/368,127, Final Office Action dated Apr. 27, 2022".

"U.S. Appl. No. 15/368,127, Response filed Jun. 27, 2022 to Final Office Action dated Apr. 27, 2022".

"U.S. Appl. No. 15/368,127, Advisory Action dated Jul. 18, 2022".

"U.S. Appl. No. 15/368,127, Final Office Action dated Apr. 27, 2021".

"U.S. Appl. No. 15/368,127, Response filed Jun. 24, 2021 to Final Office Action dated Apr. 27, 2021".

"U.S. Appl. No. 15/368,127, Advisory Action dated Jul. 2, 2021".

"U.S. Appl. No. 15/368,127, Non Final Office Action dated Oct. 1, 2021".

"U.S. Appl. No. 15/368,127, Response filed Dec. 23, 2021 to Non Final Office Action dated Oct. 1, 2021".

* cited by examiner

US 11,650,972 B1

SEMANTIC COMPLIANCE VALIDATION FOR BLOCKCHAIN

CROSS-REFERENCE TO RELATED APPLICATIONS

This application is a Non-Provisional of and claims the benefit of priority under 35 U.S.C. § 119(e) from U.S. Provisional Application Ser. No. 62/262,047, filed on Dec. 2, 2015; 62/314,333, filed Mar. 28, 2016; and 62/319,837, filed Apr. 8, 2016, each of which are hereby incorporated by reference herein in their entirety.

TECHNICAL FIELD

Embodiments described herein generally relate to parsing data structures and in particular, but without limitation, to semantic compliance validation for blockchain.

BACKGROUND

A blockchain may contain one or more blocks. A block may include one or more data entries. A hash may be included in each block that is based on the content of previous blocks in the blockchain.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 10 illustrates a schematic diagram of a report block, according to various embodiments; and in which

DETAILED DESCRIPTION

An ontology may be as a taxonomy of objects for a given field-different fields may use different ontologies. The ontology may identify types, properties, and interrelationships between the objects. When used in the electronic realm, an ontology may be used to determine if data complies with the ontology. In some examples, the definition of an ontology is described a schema.

As a simple example, consider a schema for a Person object. The schema may include a number of entries that define the properties of a Person object such as "given name," "height," "weight," etc., and the properties may also have expected types. Thus, the "height" property may have a quantitative type where as "given name" may be text. The excepted type of an object may be another object such as a property of "knows" having an expected type of Person. Accordingly, the data string "Alice knows Bob" can be thought of as two Person objects with the Alice having the "knows" property.

Another way to consider ontologies is using a "Subject, Predicate, Object" (S-P-O) format. Using the example of "Alice knows Bob," Alice is the subject, the predicate is "knows," and the object is "Bob." With reference back to the example Person schema, the predicate is the property in the schema and the expected type is the object. In other words, a schema may semantically define valid relationships between multiple objects.

Figure 1:
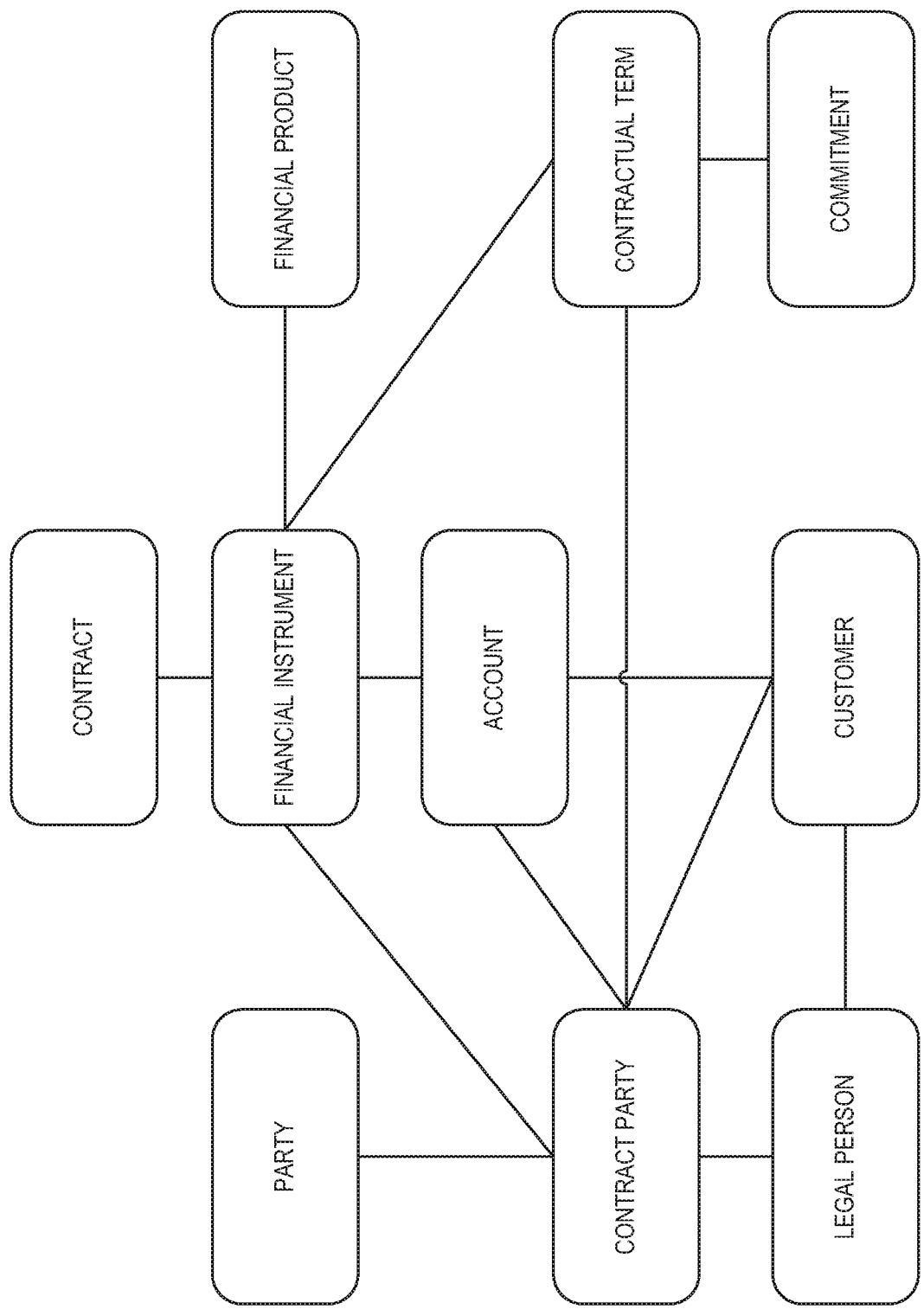
FIG. 1 is a diagram depicting relationships between objects that may be in a contract, according to various examples.

As another example, consider FIG. 1 depicting relationships between objects that may be in a contract. Industry groups may promulgate schemas/ontologies for use by their members or for communicating with their members. For example, the Financial Industry Business Ontology (FIBO™) identifies numerous objects and their semantically defined relationships common in the financial industry—such as depicted in FIG. 1. While the majority of this disclosure is focused on financial terms and use cases, the same methods can be applied to any industry (e.g., retail, health care, etc.).

Figure 2:
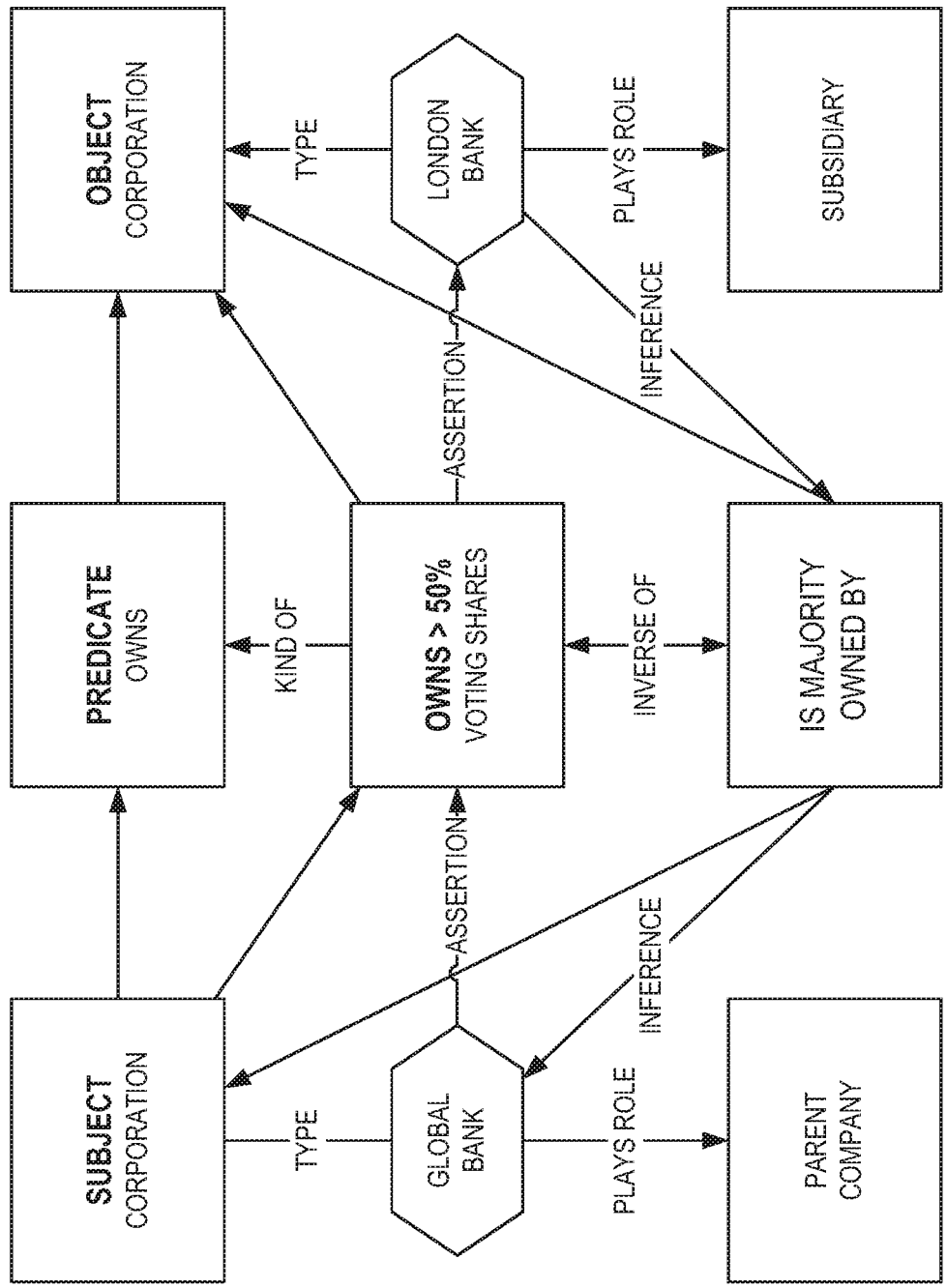
FIG. 2 is a semantic representation of a sentence, according to various examples.

FIG. 2 illustrates the concept of "Corporate Ownership" as used in a semantic ontology, according to an example. The example uses the S-P-O format discussed above. One flexibility of a semantic ontology is that data from any number of sources may be standardized and harmonized. Accordingly, once a data store (e.g., file system, relational database, NoSQL database, flat file database) is populated with enough semantically intact data, the data may be mined, stored, queried, audited, and validated. The data may originate in a number of forms such as unstructured data, a spreadsheet, a relational database, Extensible Markup Language (XML), JavaScript Object Notation, etc.

In some instances, a service (e.g., a web service) may map or translate the various formats into a common format for easier data mining. For example, a webpage may include the unstructured data "Global Bank owns >50% voting shares of London Bank." This data may be parsed into the S-P-O format of subject: Global Bank; predicate: owns; and object: London Bank. At this point, the service may update a database to indicate the relationship between Global Bank and London Bank according to a defined schema.

Regulators, or other users, may use this information when analyzing more complex transactions. For example, after enough data has been inputted into a data store, regulators—as well as financial institutions—may quickly perform systemic risk analysis or compliance with regulation W. Other use cases may be readily apparent to a person of ordinary skill in the art without departing from the scope of this disclosure and may vary depending on the technology area.

Problems may arise when large amounts of data is assumed to be compliant with an ontology but fails to meet the requirements of the ontology. In various examples, a web service may be provided that validates data according to a known schema and provides a digital compliance signature indicating the data is valid.

Figure 3:
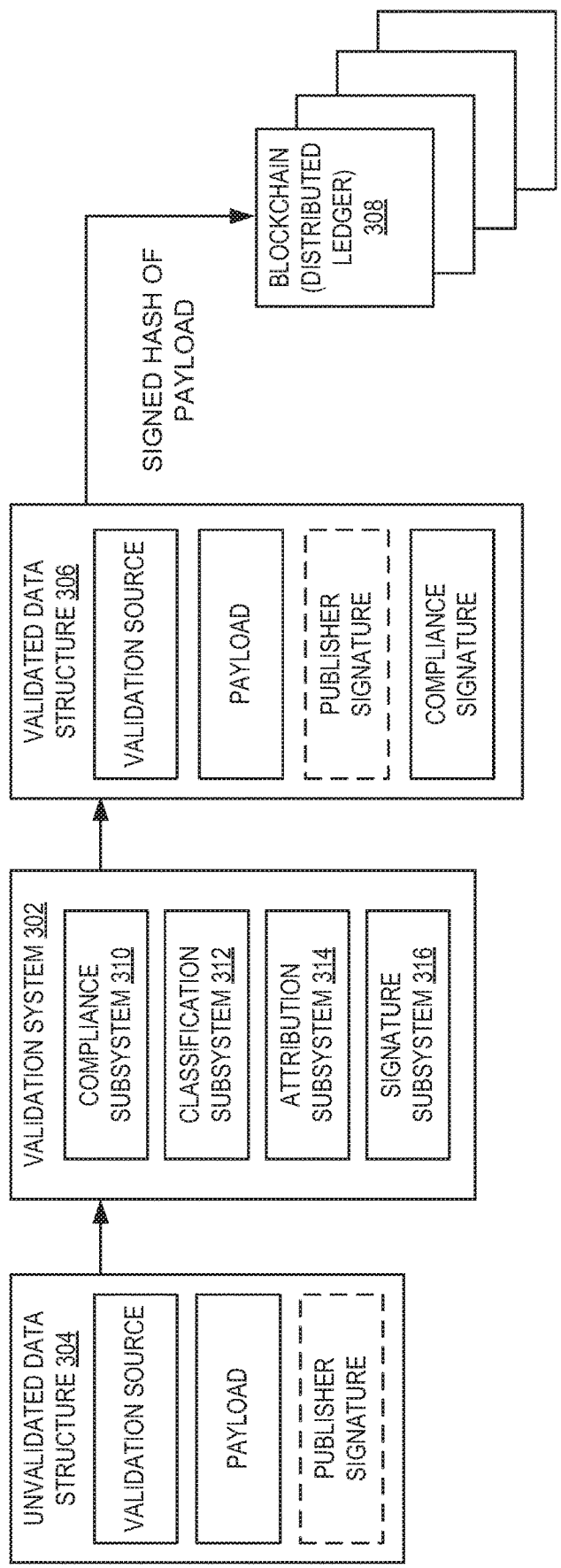
FIG. 3 illustrates a schematic diagram of validating a data structure, according to various examples.

FIG. 3 illustrates a schematic diagram 300 of validating a data structure, according to various example embodiments. The diagram 300 illustrates validating system 302, unvalidated data structure 304, validated data structure 306, and blockchain 308. The validating system 302 includes compliance subsystem 310, classification subsystem 312, attribution subsystem 314, and signature subsystem 316, according to various examples.

In various examples, the servers and components of the diagram 300 may communicate via one or more networks (not shown). The networks may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The networks may include a single local area network (LAN) or wide-area network (WAN), or combinations of LAN's or WAN's, such as the Internet.

The validating system 302 may provide an Application Programming Interface (API) to publishers of a transaction. A publisher may be any entity that wants to have data validated against an ontology. Within the financial industry, a publisher may be a financial institution such as a bank, corporation, brokerage, closing company, etc. A transaction may be a set of data that defines one or more properties of an entity within an ontology. For convenience, FIG. 3 will be discussed as an interest rate swap between two banks.

Figure 4:
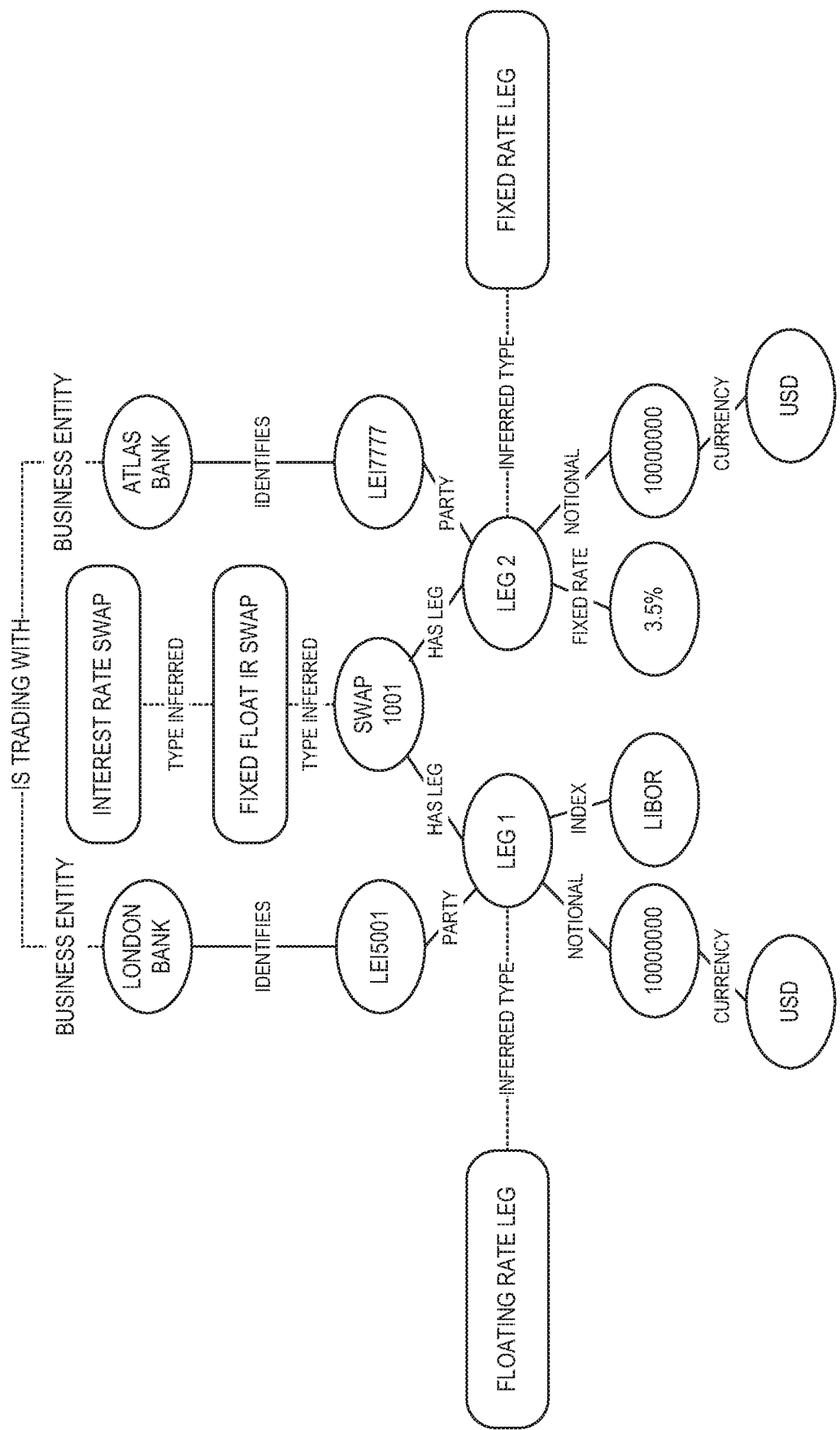
FIG. 4 is a diagram illustrating a semantic representation of an interest rate swap, according to various examples.

FIG. 4 is a diagram illustrating a semantic representation of an interest rate swap, according to various examples. In order to have the interest rate swap considered valid by other sources, the interest rate swap may be encapsulated into a format for validation by the validating system 302. Examples of encapsulation formats include, but are not limited to, XML and JavaScript Object Notation-Linked Data (JSON-LD). An addition component of JSON-LD is the identification of a schema that the payload of the JSON-LD is supposed to adhere to (referred to as the validation source in FIG. 3)

For example, the following JSON-LD encoding may be used for a swap contract such as displayed in FIG. 4:

```
{
"@context" : {
"@vocab" : "http ://spec.edmcouncil.org/fibo/Swaps/"
},
"(@type" : "SwapContract",
"hasIdentifier" : "Swap1001",
"hasSwapStream" : [
{ "@type" : "SwapStream",
"hasPayerParty" : { "@type "Party",
"hasLegalEntityIdentifier" : "LEI5001"},
"hasRate" : "0.05" },],
"hasSwapStream" : [
{ "@type" : "SwapStream",
"hasPayerParty" : { "@type "Party",
"hasLegalEntityIdentifier" : "LEI7777"},
"hasFloatingRateIndex" : { "@type "RateIndex",
"hasIdentifier" : "LIBOR" },]
}
```

The validating system 302 may include at least one web server to respond to API calls from publishers of data, such as unvalidated data structure 304. The validating system 302 may also include at least one processor to execute subsystems 310-316. The execution of the subsystems may take place in one physical computing device or be distributed across multiple computing devices. In some instances, more than one computing device completes the same task (e.g., first to complete). The computing devices may be located in one geographic area or distributed across multiple geographic areas.

In an example, the compliance subsystem 310 compares the payload of unvalidated data structure 304 to a schema as defined by the validation source. Validating may include retrieving the rules for the various entities in the payload checking for their compliance. For example, the schema may indicate that the type "SwapContract" requires two "Party" types. If the payload fails to include two parties, the unvalidated data structure 304 would be rejected as failing to comply with the schema and not added to a blockchain. In an example, the compliance subsystem 310 calls a third-party service to check the payload for validation.

The classification subsystem 312 may modify the payload if additional classifications of objects can be inferred by data in the payload. Using the example above, the JSON-LD states the first type is that of a "SwapContract" with one leg having a "hasRate" type and the second leg having a "FloatingRateIndex" type. The schema identified in the validation source may indicate that a SwapContract that includes the "hasRate" type and the "FloatingRateIndex" type is properly classified as a "FixedFloatInterestRateSwapContact." Accordingly, classification subsystem 312 may modify "SwapContract" to "FixedFloatInterestRateSwapContact."

In some instances a data structure examined by validating system 302 includes a digital signature of the publisher. The digital signature may be a hash of the payload (or of the payload and validation source) encrypted using the private key of the publisher. The attribution subsystem 314 may retrieve the public key—either included with the JSON-LD message or from a registry—of the publisher to decode the hash of the payload. The attribution subsystem 314 may also create a hash of the payload which is compared with the decoded hash. If the two hashes match, the publisher may be considered verified. Other types of attribution techniques may be used without departing from the scope of this disclosure.

If both the compliance subsystem 310 and attribution subsystem 314 indicate the payload complies with the schema, and is properly attributable to the publisher, the signature subsystem 316 may attach a compliance signature to the unvalidated data structure 304 to create validated data structure 306. The compliance signature may be based a hash the payload and optionally the validator source and publisher signature. The hash may be signed using the private key of the validating system 302. The validated data structure 306 represents an example format of a compliance signed data structure.

After a compliance signature has been added to a data structure, the validated data structure 306 may be added to a blockchain. In some instances, the payload is not included in the blockchain, but only signed hashes of the payload. The blockchain may include all the previous swap contracts; although the blockchain may not be limited to only swap contracts. Accordingly, anyone with the blockchain may trust another party that indicates the swap contract described in the example above is valid based on the signed hash or signed payload outputted by validating system 302.

In some instances, adding the validated data structure 306 to the blockchain is accomplished by distributing the validated data structure 306 to numerous anonymous servers.

The servers may need to complete a computationally difficult calculation in order to add validated data structure 306 to the blockchain. The calculation may require using a hash of previously added information to the blockchain. In such as a manner, the blockchain becomes difficult to improperly modify. Once added, the blockchain may be trusted by other parties despite the anonymous nature of the servers.

For example, similarly to how attribution subsystem 314 determines a valid publisher, a party could take the public key of validating system 302 to decode the compliance signature, resulting in the hash of the payload. The party could independently calculate the hash of the payload and compared to the decoded hash. If the hashes match, the party can know that the transaction in the payload is valid and attributable to the publisher. As indicated above, in some instance the compliance signature does not include the publisher signature in the hash. Thus, in some instances, blockchain includes the payload signed by both the publisher and the validating system 302.

Figure 5:
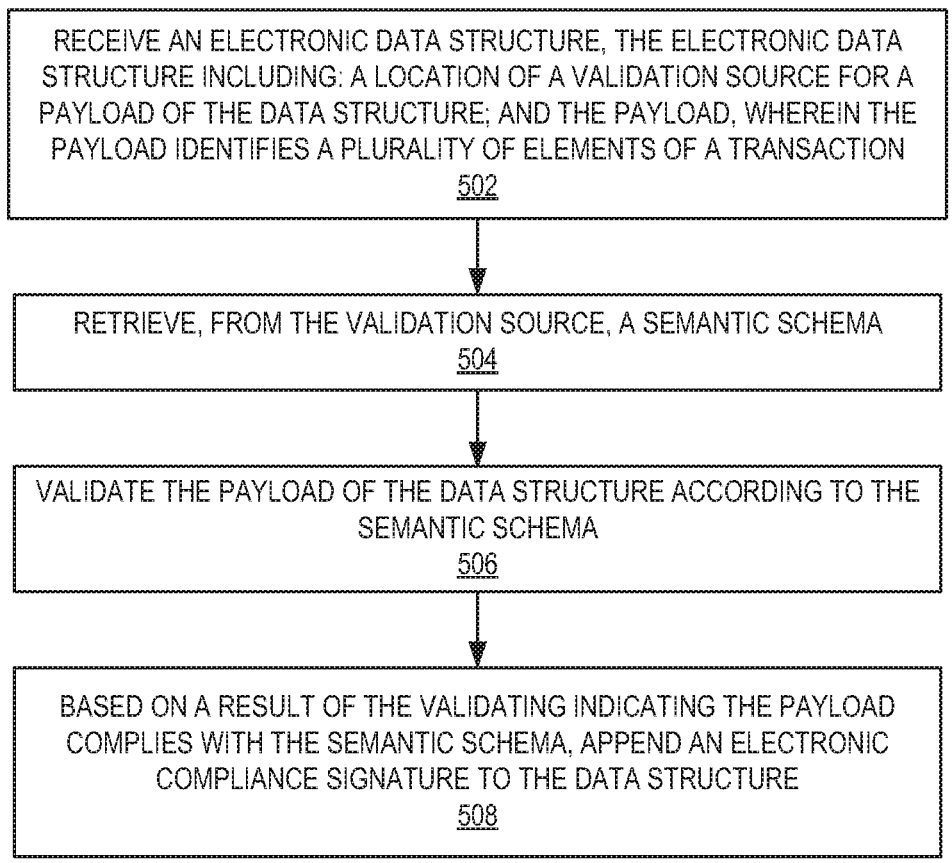
FIG. 5 illustrates a flowchart of a method of adding a compliance signature to a data structure, according to various examples.

FIG. 5 illustrates a flowchart of method of adding a compliance signature to a data structure. The method may be performed by executing, using at least one processor, instructions stored on a non-transitory computer-readable medium.

At operation 502, an electronic data structure may be received. The electronic data structure may include a location of a validation source for a payload of the data structure. The location may be a uniform resource identifier that links to a semantic schema. The semantic schema may be retrieved (operation 504). The semantic schema may identify rules such as names of object types (also referred to an elements), properties of object types, valid values for the properties, restriction on operations of object types with respect to other object types, among other things.

The data structure may also include a payload. The payload may identify at least one object type, a property of the object, and a value for the property. Multiple objects may be included in the data structure as well multiple different object types. In an example, the electronic data structure conforms to the JSON-LD format. The data structure may also include a digital signature of the publisher of the electronic data structure.

At operation 506, the data structure may be validated according to the semantic schema. The rules of the semantic schema may be compared to the elements of the data structure for validation. For example, properties included in the data structure may be compared to valid properties according to the schema. Similarly, the values for the properties may be compared to the valid values for the properties.

An element of the payload may be modified based on the schema. For example, the schema may identify a hierarchy of elements (parent/child, genus/species, etc.). The data structure may identify a genus object but an examination of the properties of the genus object may be used to infer the genus could only be one of the species objects. Thus, the genus object may be altered to the species.

At operation 508, based on a result of the validating indicating the payload complies with the semantic schema, an electronic compliance signature may be appended to the data structure. The payload may be hashed and encrypted using a private key to create the electronic compliance signature. Additionally, a blockchain that includes at least one block with at least one transaction may be retrieved. The hashed payload signed by the electronic compliance signature may be appended to the blockchain. In an example, the payload with the compliance signature is appended to the block chain instead of (or in addition to) a hashed version of the payload.

Different version of the payload may be appended to the blockchain. For example, when the payload is modified as above, two versions of the payload may be appended to the blockchain: one hashed payload with the changes and one hashed payload without the changes. The hashes may be signed as indicated above. Additionally, sometimes the hash may include the digital signature of the publisher and other times the hash may be created without the digital signature.

Standardized ontologies and blockchains may have additional uses beyond, or in addition to, the data validation methods described above. For example, smart contracts may leverage the ontology in describing the components of a contract. A smart contract may be a contract that is described in terms of an electronic program construct as opposed to written in prose. A smart contract may be partially or completely automated.

A smart contract may define, programmatically (e.g., functionally, procedural), conditional logic with respect to the performance of the contract. For example, consider a relatively straightforward exchange stock purchase. Via a broker, a user may offer to purchase X dollars worth of a stock at a certain price. The user may an account with the broker with money set aside for the purchase. Upon the stock being at the price, the broker may purchase the stock on behalf of the user and debit the user's account. Conceptually, a smart contract may have a condition of "IF stock XYZ>=$45 a share, THEN purchase 5 shares AND debit account the purchase price."

The state of the contract may be stored in blockchain. In other words, each variable of a contract (e.g., the stock price in the previous example) may have a value on the blockchain (as well as the history of its value). Because the execution of the contract is generally fully automated, fraud may occur if one party updates the state of the contract with an invalid/incorrect value. For example, if a nefarious party changes the state to indicate there is more money in an account then there is actually is a stock trade may execute even if there is not enough money to cover the cost of the purchase.

Figure 6:
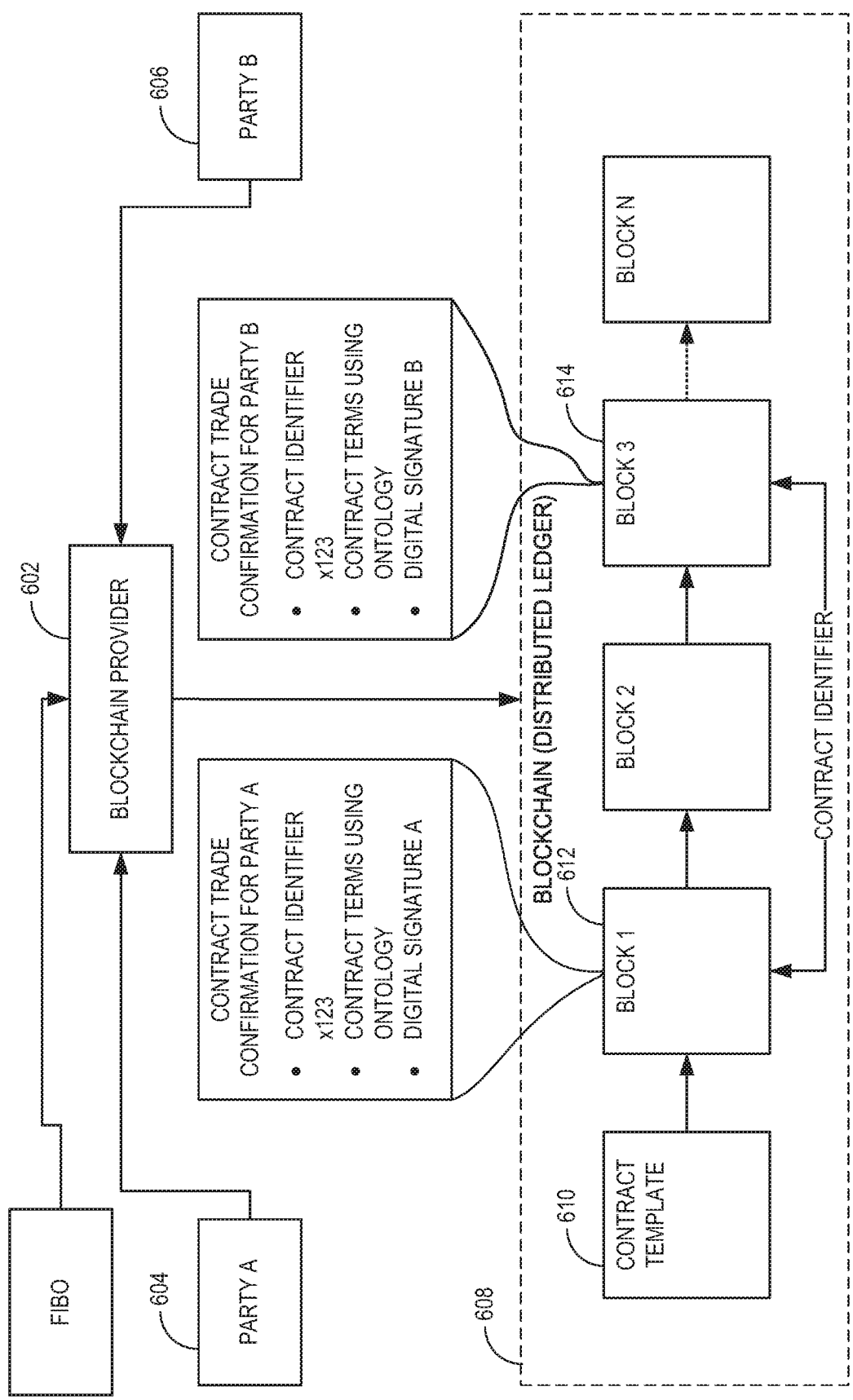
FIG. 6 illustrates a schematic diagram of a system of using smart contracts and a blockchain.

FIG. 6 illustrates a schematic diagram of a system of using smart contracts and a blockchain. The system illustrates blockchain provider 602, a first party 604, a second party 606, and a blockchain 608. The blockchain 608 includes a number of blocks identified as contract template block 610, block 612 and block 614.

One solution to the invalid values problem described above, is to use a stateful blockchain. In contrast to a stateless blockchain, such as used with bitcoins, a stateful blockchain maintains the values—in this case contract values, among other operational values. The blockchain 608 may therefore be queried to see if a contract may be completed. The benefits of a blockchain is one of trust in a decentralized environment. A query, or update of variable, may be calculated by a number of participating nodes to arrive at the true value of a variable. If a single bad actor tries to change a value, the other nodes will reject it and it will not be added to the blockchain.

The blockchain may also include a template for different contracts. The contract templates may be defined according to an ontology, such as FIBO. The format of the data entered on the blockchain 608 may be a JSON-LD encoding adhering to FIBO. The blockchain 608 may be public or private, and may have access right restrictions.

One requirement for a contract may be a contract identifier. The contract identifier may be used by all parties to the contract. For example, consider that the contract trade in FIG. 6 is a swap contract. As described above, a JSON-LD encoding may be used for the swap contract and may begin:

```
{
"@context" : {
"@vocab" : "http://spec.edmcouncil.org/fibo/Swaps/"
},
"@type" : "SwapContract",
"hasIdentifier" : "Swap1001",
"hasSwapStream" : [
. . .
```

The "Swap1001" may identify the swap and both party A and party B may use it.

Furthermore, the identifier may be used by to find confirmation of the trade across blocks of the blockchain 608. For example, the confirmation of the trade for party A may be in block 612 and the confirmation of the trade for party B may be in block 614. In various examples, the identifier may be hashed onto the blockchain to cryptographically point to two (or more) disparate parts of the blockchain 608. The hash may be such that the hash may not be used for a different swap. Again, this is different than the stateless blockchain of bitcoin in which anonymity and non-traceability are features. The identifier may be generated by the party that initiates the contract.

Another benefit of a stateful blockchain is one can see the state of a contract evolve over time. As mentioned, a smart contract may have a number of terms and conditions. The blockchain 608 may be examined to see which of these conditions have been met and when they were met. The blockchain 608 may also indicate that when a contract has been completed, when both sides of a contract confirm the contract, etc. The contract may also trigger execution of other transactions, also stored on the blockchain 608 (e.g., the state of a variable may trigger execution).

Another benefit of a standardized ontology (optionally with validation signatures) on a blockchain is for auditing purposes. Regulations may require that each entry in a report indicate where it came from, when it occurred, other entries/transactions it implicates, etc. When every transaction is verified, and signed as adhering to a standard ontology, auditing because much easier. For example, a federal agency may be given keys to unlock all, or a subset, of encrypted transaction data on a blockchain to verify reports as necessary. The inherent properties of a blockchain coupled with the signed verifications may be give the agency the confidence that no fraudulent data is present. The data in the blockchain may also identify the location of generated regulatory reports as well as the locations of the data necessary to validate the reports.

By way of example, the Home Mortgage Disclosure Act (HMDA) has numerous requirements. Within an organization, each line of business (LOB) such as mortgage, also banking, and home equity, and generate reports for complying with the HMDA. Quarterly, these reports may be aggregated and manual and statistical review may take place to try and avoid any errors. On an annual basis, these quarterly reports may be created and provided to the Consumer Finance Protection Bureau (CFPB) for examination. The CFPB may then have to manually go back and examine the reports to ensure HMDA compliance.

Because of the manual nature of many of the reporting tasks, it may be difficult to determine who put what in each report, when it was added to the report, what calculations were used to generate the numbers in reports, and what were the sources of the data in the reports. As discussed further below, the use of a blockchain provides data security and attribution and immutability. The blockchain may be public or private, and may have access right restrictions.

Figure 7:
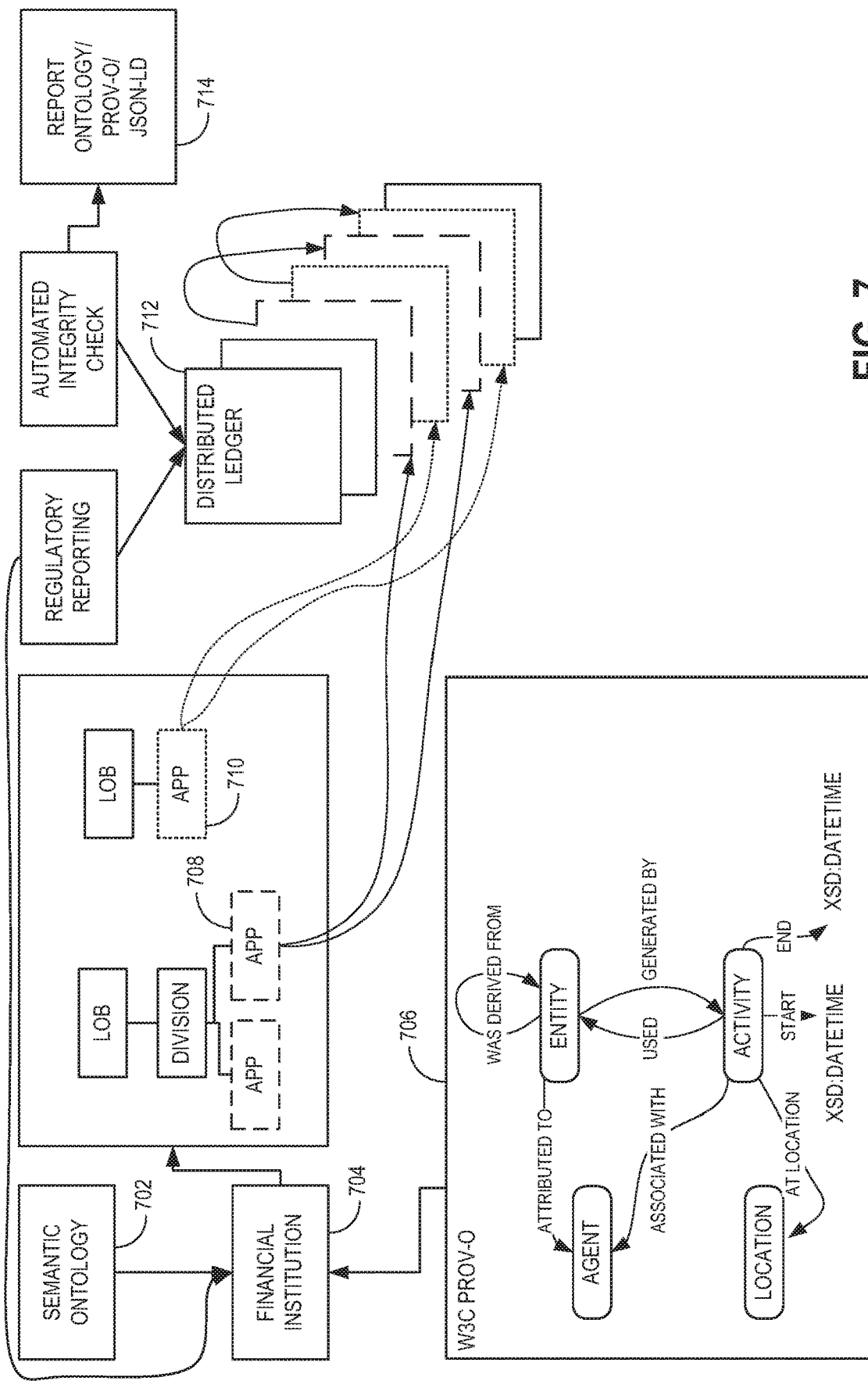
FIG. 7 illustrates a schematic diagram of auditing and reporting using a blockchain, according to various examples.

FIG. 7 illustrates a schematic diagram of auditing and reporting using a distributed ledger (e.g., a blockchain), according to various examples. FIG. 7 includes, semantic ontology 702, financial institution 704, provenance ontology 706, app 708, app 710, distributed ledger 712, and report 714. The lines between app 708, app 710, into the distributed ledger 712 may represent report block entries. A report block entry may comprise a series of identifiers to information needed to retrieve and verify a report, such as report 714. These entries are discussed in further detail in FIGS. 8-10, but an overview of the system is presented in FIG. 7.

The financial institution 704 may represent an entity that is required to provide one or more reports to one or more government agencies. The use of the system in FIG. 7 is not limited to such uses and may be utilized by other any organization that requires verified reporting. The financial institution 704 may have its own semantic ontology 702 that describes data stored within the financial institution 704. In some instances, the semantic ontology 702 is a standardized ontology such as FIBO. In further instances the semantic ontology 702 may be a superset of FIBO.

The provenance ontology 706 may define an ontology language to indicate, among other things, roles and identities responsible for entries in a report. Thus, in addition to providing the regulatory requirements (e.g., required data) the report may include entries in accordance with the provenance ontology 706 that indicate where the data come from, when it was there, etc. In some examples, the entries corresponding to the provenance ontology 706 are stored in a separate file, such as a provenance log. The provenance log may include entries related to one or more reports.

FIG. 7 illustrates that financial institution 704 has a few different lines of business (LOB). Underneath the LOBs, app 708 and app 710 are distinguished from each other based on the line pattern. The line patterns correspond to different blocks in the distributed ledger 712—indicating different report entries associated with app 708 and 710.

The distributed ledger 712 may include a reporting block that identifies the various LOBs and associated apps and relevant portions of the distributed ledger 712 related to their respective reports. The identification may be in the form of cryptographic pointer identifying the previous block of the distributed ledger 712 relevant to the report (or previous reports). That previous block may include another pointer that identifies the "next" previous block. In such a manner, a regulatory agency may trace back-in-time through the distributed ledger 712 to retrieve the relevant data for a report associated with a given app and verify it for auditing purposes.

Figure 8:
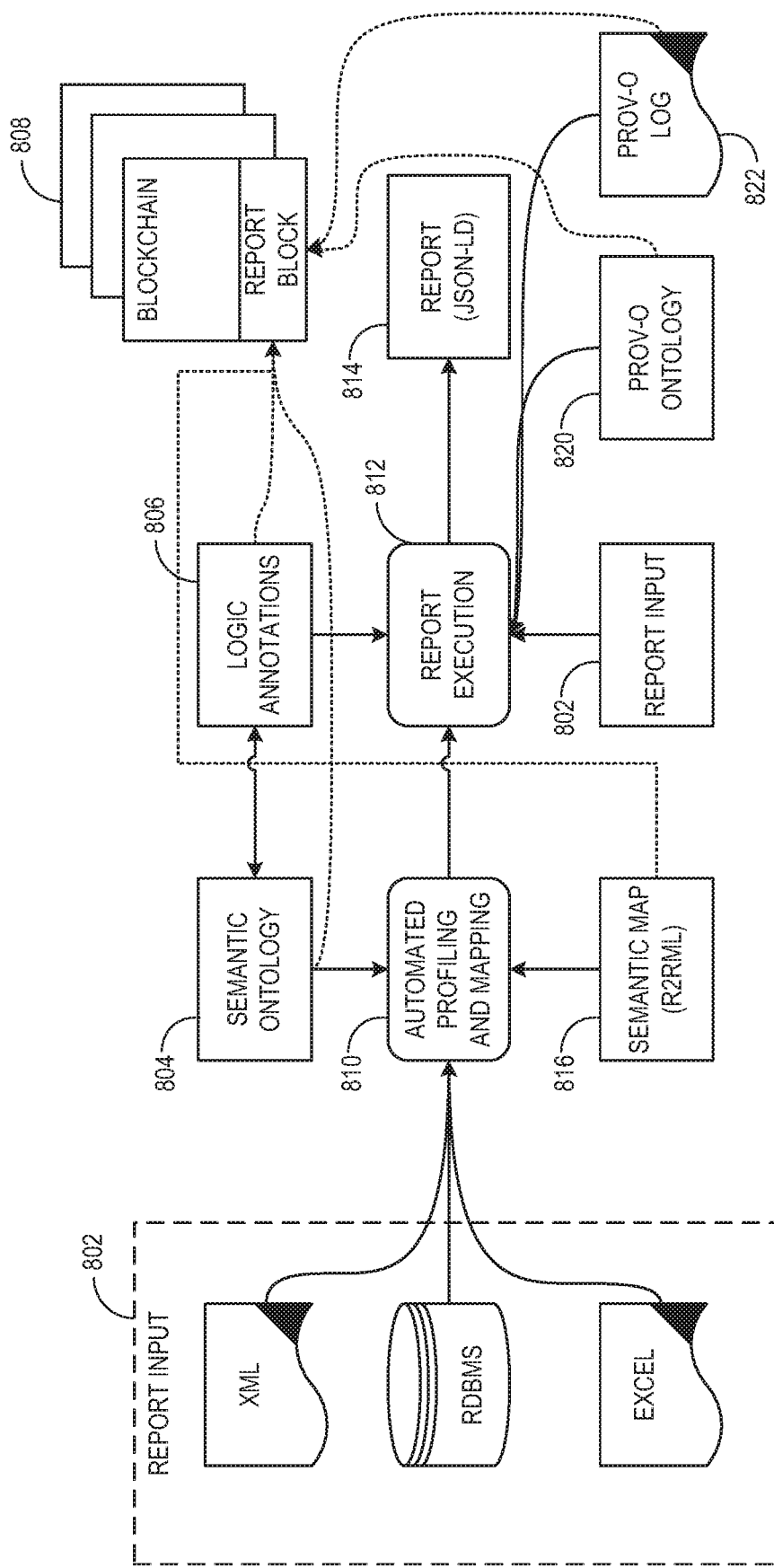
FIG. 8 illustrates a schematic diagram of a system for generating a report block, according to various embodiments.

FIG. 8 illustrates a schematic diagram of a system for generating a report block. FIG. 8 include report input 802, semantic ontology 804, logic annotations 806, blockchain 808, automated profiling and mapping component 810, report execution component 812, report 814, semantic map 816, provenance ontology 820, and provenance log 822. The various components in FIG. 8 may be distributed across multiple computing devices in multiple geographic locations, or they may be located in a single computing device in a single location. The execution of the various components may completely automated or partially automated.

The report input 802 identifies the data sources that store data for an organization, such as a financial institution. The sources may XML documents, databases, Excel documents, etc.

The semantic map 816 may in the form of R2RML, which is a relational database (RDB) to RDF mapping proposed W3C standard. One purpose of R2RML is to facilitate a map of existing relational data—as encapsulated in one or more databases—to the RDF data model. The input for an R2RML mapping is a logical table that may be a base table, a view, or a valid SQL query. The output of the R2RML is a mapping of the logical table to a RDF using a triple map. A triple map is a rule that takes each row in one of the logical tables to an RDF triple. The rule may have two components, the subject map and a multiple predicate-object map, which may be made up of predicate maps and object maps. The triple for a given database row may be formulated by combining the subject map with a predicate map and an object map.

The proposed W3C documentation provides the following, slightly modified, example. Consider a database table EMP. The EMP table includes three columns: EMPNO, ENAME, JOB. A row of the EMP table is "7639:SMITH: CLERK." A triple map may for the EMP table may be:

```
@prefix rr: <http://www.w3.org/ns/r2rml1#>.
@prefix ex: <http://example.com/ns#>.
<#TriplesMap1>
    rr:logicalTable [ rr:tableName "EMP" ];
    rr:subjectMap [
    rr:template
"http://data.example.com/employee/{EMPNO}";
    rr:class ex:Employee;
    ];
    rr:predicateObjectMap [
    rr:predicate ex:name;
    rr:objectMap [ rr: column "ENAME" ];
    ].
```

The output of the R2RML may be

```
http://data.example.com/employee/7369> rdf:type
ex:Employee.
<http://data.example.com/employee/7369>
ex:name "SMITH".
```

In FIG. 8, the semantic map 816 may include mappings from the semantic ontology 804 to the report inputs 802. In other words, the semantic map 816 may identify where, within the data sources of an organization, the relevant data for the report 814 is located.

In a simplified example, consider a report that requires all mortgage transactions. A person or computer program—such as automated profile and mapping component 810—may first look to the semantic ontology 804 to see how a mortgage is classified (e.g., what type of object). Then, the semantic map 816 may be parsed to determine what columns in what database tables map to the classification. The report execution component 812 may receive data (e.g., through an API) from the automated profile and mapping component 810 that indicates the location of data for a given report. A report definition template may identify the requirements for a given report. For example, it may be identify what data is needed, in what format, for what time periods, etc.

Figure 9:
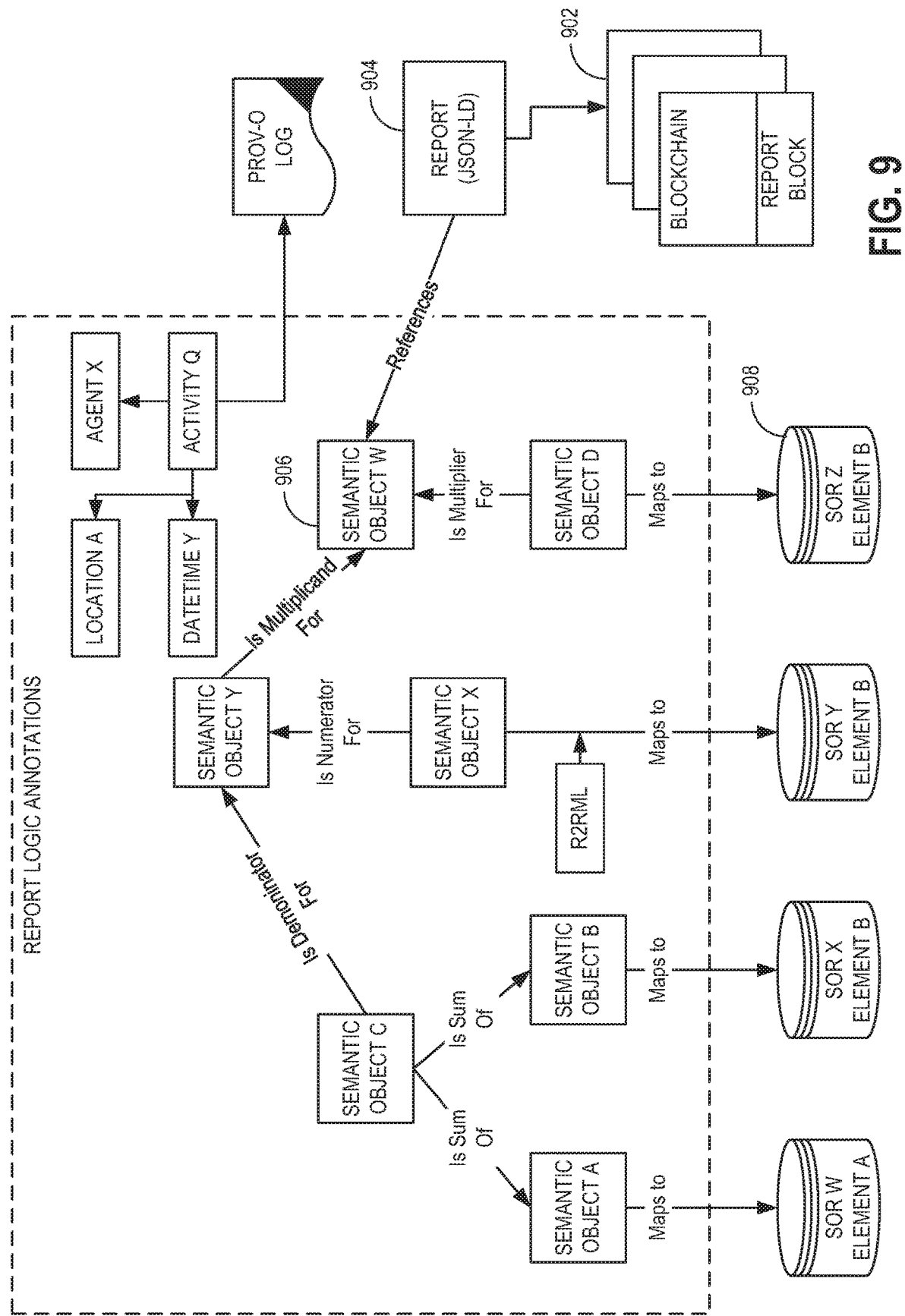
FIG. 9 illustrate a diagram of a logic annotation, according to various embodiments.

The report execution component may also retrieve logic annotations 806 to facilitate the execution of the report. The logic annotations 806 may define, using the semantic ontology 804, how to calculate the data for a given report. FIG. 9 illustrate a diagram of a logic annotation. Although shown diagrammatically, the logic annotation may be stored in a XML format adhering to the semantic ontology 804.

FIG. 9 includes blockchain 902, report 904, semantic object 906, and data source 908. Consider an auditor, which may be a computer program, that accesses blockchain 902, and a report block leads the auditor to report 904 (discussed in further detail with respect to FIG. 10). The report 904 may reference one or more semantic objects, such as semantic object 906. In order to determine if the value for the semantic object 906 is correct, a logic annotations file may be examined. The file may indicate how the object is used with respect to other semantic objects, as well as indicate the data sources for the semantic object. In such a manner, an auditor may independently calculate the data in the report 904. In some instances, the logic annotations may include provenance data indicating when the logic annotation file was created, who created it, etc.

With reference back to FIG. 8, the report execution component 812 may generate the report 814 using the logic annotations 806 and report input 802. The report execution component 812 may also gather the locations (e.g., logical locations such as URI locations) of the data sources and attribution sources (e.g., provenance ontology 820) are located for a given report. This information may be placed into the report block for a given report as discussed next with reference to FIG. 10.

Figure 10:
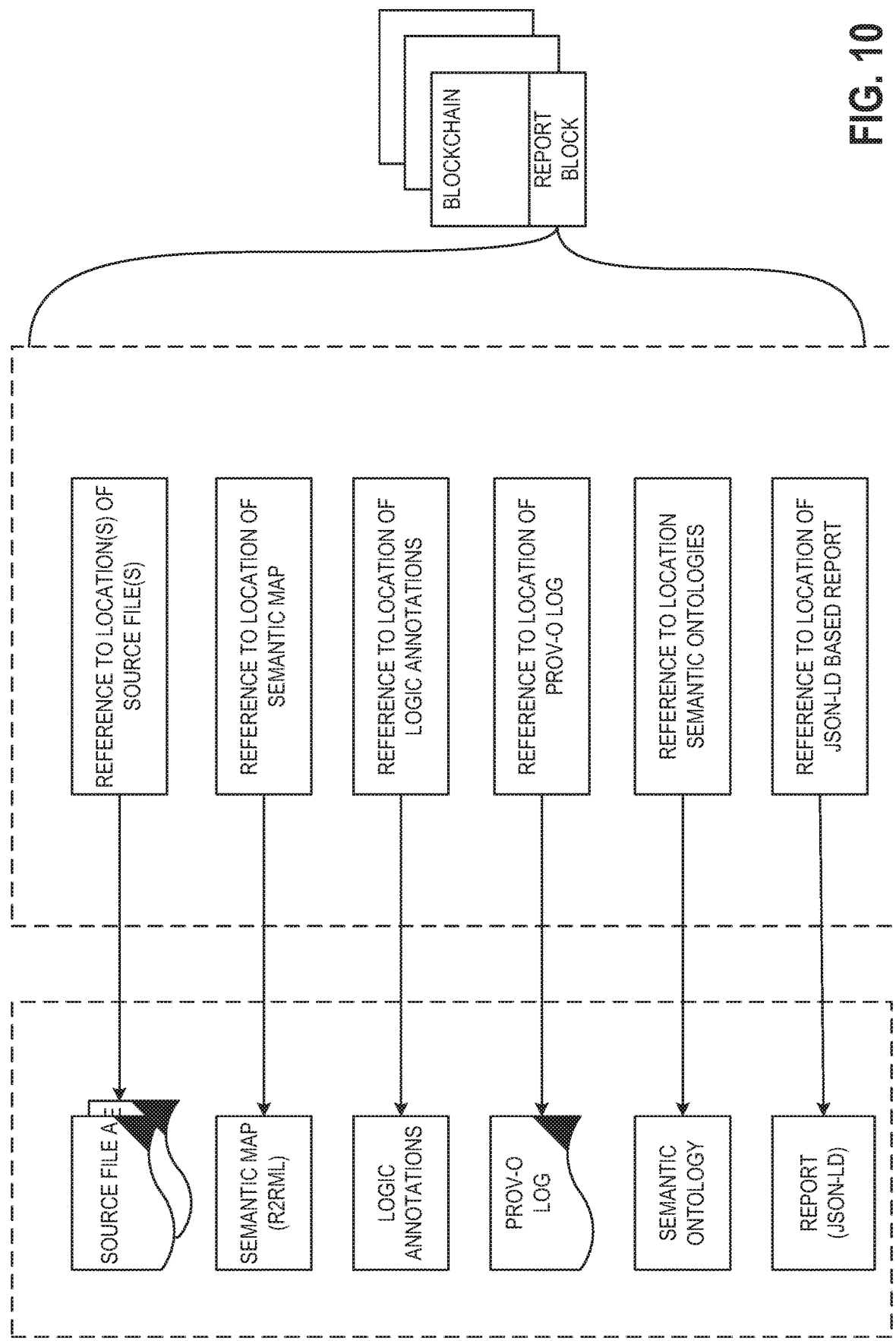

FIG. 10 illustrates a schematic diagram of a report block, according to various embodiments. A report block may be part of a block of the blockchain. The blockchain may include hundreds, thousands, or more blocks. A report block may include references to locations of files for a given report. The report block may include references to sources files (e.g., the underlying source of data in the report), a location of a semantic map (e.g., R2RML mappings), a reference to logic annotations for semantic objects in the report, a reference to a provenance log, a reference to a semantic ontology used in the report, and a reference to the underlying report itself. The report block may also include a reference to a previous block in the blockchain that includes the previous report (e.g., the report for the previous quarter). The information in the report block may be encrypted, signed, or both. In an example, the data is encrypted using a public key of a regulatory agency that needs the report.

Figure 11:
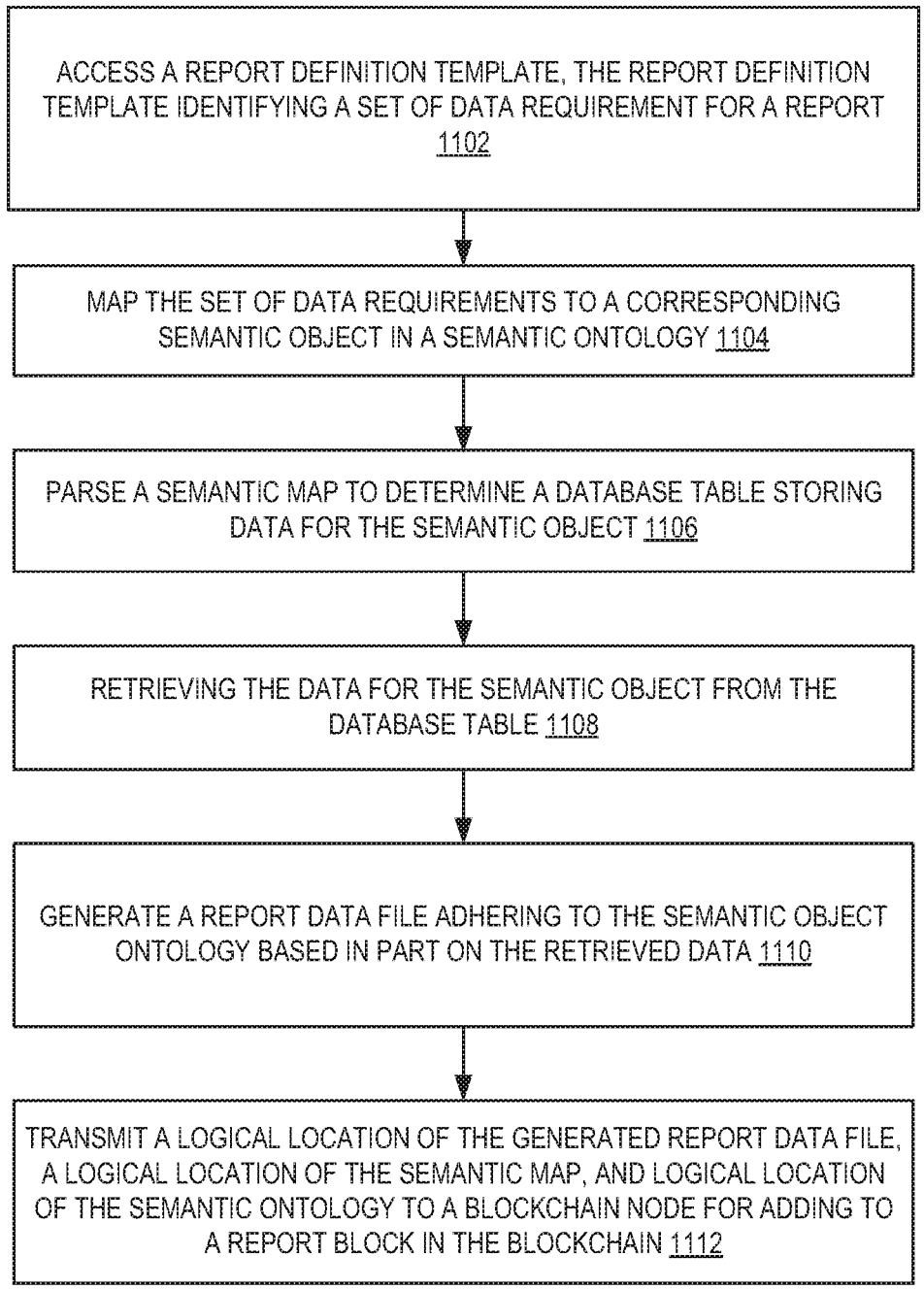
FIG. 11 illustrates a flowchart of a method of, according to various examples

FIG. 11 illustrates an example method that may be performed by one or more processors executed instructions stored in a non-transitory computer readable medium. In various example embodiments, a method may include accessing a report definition template (1102), the report definition template identifying a set of data requirement for a report. A requested report may include a report type. Each template may have a corresponding report type. Thus, a database may be queried using the report type to retrieve the corresponding template.

The report definition file may identify logic annotations for calculating the semantic object and wherein the location of the logic annotations are transmitted to the blockchain for adding to the report block.

The method may further include mapping the set of data requirements to a corresponding semantic object in a semantic ontology (1104) and parsing a semantic map to determine a database table storing data for the semantic object (1106). The method may include retrieving the data for the semantic object from the database table (1108). The method may also include generating a report data file adhering to the semantic object ontology based in part on the retrieved data (1110). The report data file may the data transmitted for adding to a report block in a blockchain.

The method may also include transmitting a logical location of the generated report data file, a logical location of the semantic map, and logical location of the semantic ontology to a blockchain node for adding to a report block in the blockchain (1112).

The method may also include accessing a provenance log identifying an entity that entered the data in the database table. The provenance log may be formatted according to a provenance ontology. The logical location of the provenance log and the provenance ontology may be transmitted to the blockchain node for adding to the report block.

The method may further include retrieving an identifier of a previously computed report using the report definition template; querying a database to determine a block identifier for that includes a report block for the previously computed report; and transmitting the block identifier to the blockchain node for adding to the report block in the blockchain.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 12:
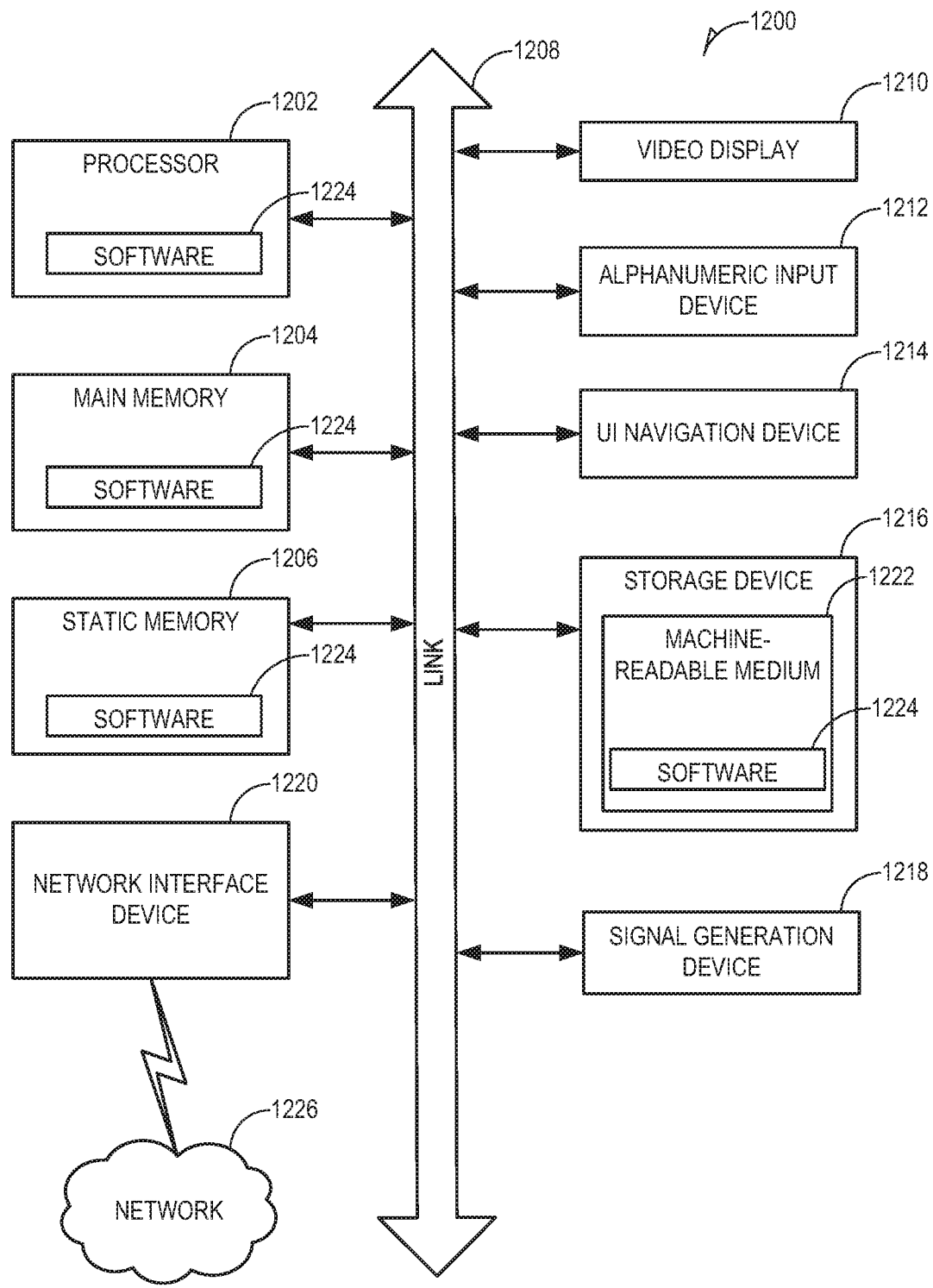
FIG. 12 is a block diagram illustrating an example machine upon which any one or more of the techniques (e.g., methodologies) discussed herein may be performed, according to an example embodiment.

FIG. 12 is a block diagram illustrating a machine in the example form of a computer system 1200, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1200 includes at least one processor 1202 (e.g., a central processing unit (CPU), a graphics processing unit (GPU) or both, processor cores, compute nodes, etc.), a main memory 1204 and a static memory 1206, which communicate with each other via a link 1208 (e.g., bus). The computer system 1200 may further include a video display unit 1210, an alphanumeric input device 1212 (e.g., a keyboard), and a user interface (UI) navigation device 1214 (e.g., a mouse). In one embodiment, the video display unit 1210, input device 1212 and UI navigation device 1214 are incorporated into a touch screen display. The computer system 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, or another sensor.

The storage device 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204, static memory 1206, and/or within the processor 1202 during execution thereof by the computer system 1200, with the main memory 1204, static memory 1206, and the processor 1202 also constituting machine-readable media.

While the machine-readable medium 1222 is illustrated in an example embodiment to be a single medium, the term "machine-readable medium" may include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   receiving, at a computing device, an electronic data structure, the electronic data structure including:
   a location of a validation source for a payload of the electronic data structure; and
   the payload, wherein the payload identifies a plurality of elements of a transaction;
   retrieving, from the validation source, a semantic schema, the semantic schema defining properties of object types in a semantic ontology;
   determining that classifications of objects can be inferred by data in the payload;
   modifying the payload using the semantic schema in response to determining that the classifications of the objects can be inferred from the data in the payload, wherein the payload is modified based on a relationship between the objects indicated in the semantic schema;
   validating the modified payload of the electronic data structure according to the semantic schema; and
   based on a result of the validating indicating the payload complies with the semantic schema, appending an electronic compliance signature to the electronic data structure.

2. The method of claim 1, further comprising:
   encrypting a hash of the payload with a private key to create the electronic compliance signature;
   signing the hashed payload with the electronic compliance signature;
   retrieving a blockchain, the blockchain including at least one block, the at least one block including a signed hash of at least one with at least transaction; and
   appending the signed hashed payload to the blockchain.

3. The method of claim 1, wherein inferring the modification using the semantic schema includes inferring a change from a genus to a species of a type of the element.

4. The method of claim 1, wherein the electronic data structure further includes a digital signature of a publisher of the electronic data structure.

5. The method of claim 4, further comprising:
   hashing the electronic data structure without the digital signature of the publisher;
   retrieving a blockchain, the blockchain including at least one block, the at least one block including a signed hash of at least one transaction;
   signing the hashed electronic data structure using the electronic compliance signature; and
   appending the signed hashed electronic data structure to the blockchain.

6. The method of claim 4, further comprising:
   hashing the electronic data structure and the digital signature of the publisher;
   retrieving a blockchain, the blockchain including at least one block, the at least one block including a signed hash of at least one transaction;
   signing the hashed electronic data structure using the electronic compliance signature; and
   appending the signed hashed electronic data structure to the blockchain.

7. The method of claim 4, further comprising:
   verifying the publisher of the electronic data structure based on the digital signature.

8. A non-transitory computer readable medium comprising instructions, which when executed by at least one processor, configure the processor to perform operations comprising:
   receiving an electronic data structure, the electronic data structure including:
   a location of a validation source for a payload of the electronic data structure; and
   the payload, wherein the payload identifies a plurality of elements of a transaction;
   retrieving, from the validation source, a semantic schema, the semantic schema defining properties of object types in a semantic ontology;
   determining that classifications of objects can be inferred by data in the payload;
   modifying the payload using the semantic schema in response to determining that the classifications of the objects can be inferred from the data in the payload, wherein the payload is modified based on a relationship between the objects indicated in the semantic schema;
   validating the modified payload of the electronic data structure according to the semantic schema; and
   based on a result of the validating indicating the payload complies with the semantic schema, appending an electronic compliance signature to the electronic data structure.

9. The non-transitory computer readable medium of claim 8, the operations further comprising:

encrypting a hash of the payload with a private key to create the electronic compliance signature;

signing the hashed payload with the electronic compliance signature;

retrieving a blockchain, the blockchain including at least one block, the at least one block including a signed hash of at least one transaction; and appending the signed hashed payload the blockchain.

10. The non-transitory computer readable medium of claim 8, wherein inferring the modification using the semantic schema includes inferring a change from a genus to a species of a type of the element.

11. The non-transitory computer readable medium of claim 8, wherein the electronic data structure further includes a digital signature of a publisher of the electronic data structure.

12. The non-transitory computer readable medium of claim 11, the operations further comprising:

hashing the electronic data structure without the digital signature of the publisher;

retrieving a blockchain, the blockchain including at least one block, the at least one block including a signed hash of at least one with at least transaction;

signing the hashed electronic data structure using the electronic compliance signature; and appending the signed hashed electronic data structure to the blockchain.

13. The non-transitory computer readable medium of claim 11, the operations further comprising:

hashing the electronic data structure and the digital signature of the publisher;

retrieving a blockchain, the blockchain including at least one block, the at least one block including a signed hash of at least one transaction;

signing the hashed electronic data structure using the electronic compliance signature; and appending the signed hashed electronic data structure to the blockchain.

14. The non-transitory computer readable medium of claim 11, the operations further comprising:

verifying the publisher of the electronic data structure based on the digital signature.

15. A system comprising:

at least one processor;

a storage device comprising instructions, which when executed by the at least one processor, configure the processor to perform operations comprising:

receiving an electronic data structure, the electronic data structure including:

a location of a validation source for a payload of the electronic data structure; and the payload, wherein the payload identifies a plurality of elements of a transaction;

retrieving, from the validation source, a semantic schema, the semantic schema defining properties of object types in a semantic ontology;

determining that classifications of objects can be inferred by data in the payload;

modifying the payload using the semantic schema in response to determining that the classifications of the objects can be inferred from the data in the payload, wherein the payload is modified based on a relationship between the objects indicated in the semantic schema;

validating the modified payload of the electronic data structure according to the semantic schema; and based on a result of the validating indicating the payload complies with the semantic schema, appending an electronic compliance signature to the electronic data structure.

16. The system of claim 15, the operations further comprising:

encrypting a hash of the payload with a private key to create the electronic compliance signature;

signing the hashed payload with the electronic compliance signature;

retrieving a blockchain, the blockchain including at least one block, the at least one block including a signed hash of at least one transaction; and appending the signed hashed payload the blockchain.

17. The system of claim 15, wherein inferring the modification using the semantic schema includes an operation of inferring a change from a genus to a species of a type of the element.

* * * * *